UNITED STATES PATENT OFFICE.

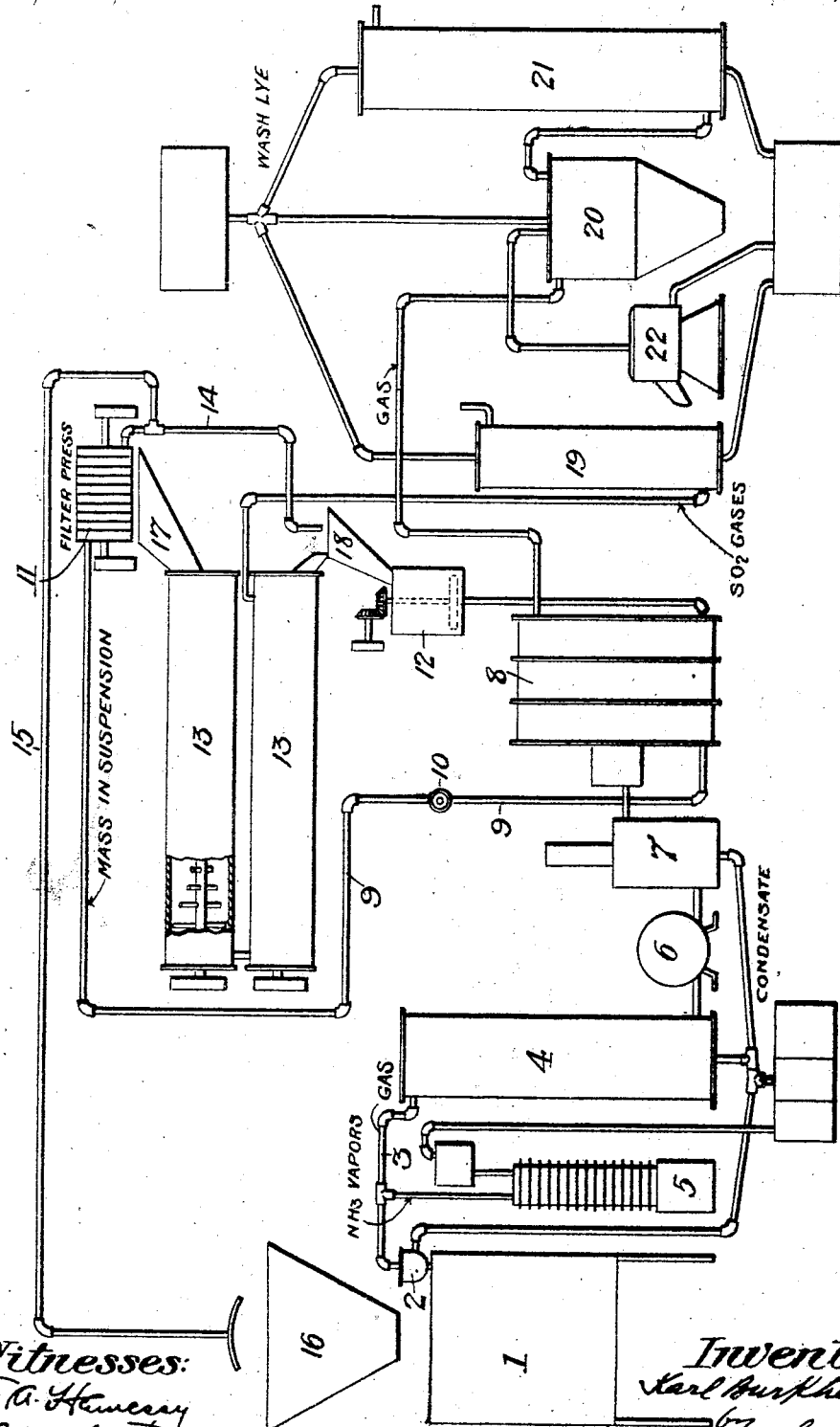

KARL BURKHEISER, OF HAMBURG, GERMANY, ASSIGNOR TO BURKHEISER & COMPANY (GESELLSCHAFT MIT BESCHRANKTE HAFTUNG), OF HAMBURG, GERMANY, A CORPORATION.

PURIFYING GASES OF DRY DISTILLATION AND RECOVERING THE BY-PRODUCTS THEREOF.

1,160,836.  Specification of Letters Patent.  Patented Nov. 16, 1915.

Application filed August 7, 1912. Serial No. 713,750.

*To all whom it may concern:*

Be it known that I, KARL BURKHEISER, a subject of the Emperor of Germany, residing in the city of Hamburg, Empire of Germany, have invented certain new and useful Improvements in Purifying Gases of Dry Distillation and Recovering the By-Products Thereof; and I do hereby declare the following to be a full, clear, and exact description of the invention, such as will enable others skilled in the art to which it appertains to make and use the same.

The methods heretofore customary in practice for the purification of the gases of coal distillation by the removal of sulfureted hydrogen therefrom have consisted almost without exception in passing the gases over lime or over an artificial or natural body of hydrated iron oxid, after the gases have been freed from tar and ammonia. This manner of purifying the gases from sulfureted hydrogen requires exceedingly extensive purifying devices on account of the extraordinary slowness of reaction of the materials employed under the usual conditions prevailing. The method known as the Burkheiser method, whereby the capacity for reaction of the purifying mass employed was increased by a preliminary treatment of the mass, involved an advance over the prior state of the art in this direction. Nevertheless, all of these methods of purifying, including the preparatory treatment of the mass, relate to so-called "dry purification", whereas "wet purification" has always been regarded as the ideal method for gas purifying, and many inventors and others skilled in the art have attempted to devise a practically utilizable method of that type. So far as I am aware, none of these efforts have heretofore been sufficiently acceptable to find permanent acceptance in practice.

The seemingly obvious method of wet purification is the washing of gases by a metal salt solution. Experiments in this direction, however, proved unavailing because the metal salt solution was either difficult to regenerate or could not be regenerated at all, for which reason these methods were economically unsatisfactory. For instance, the very interesting method of Claus may be referred to in this connection, wherein the gases were washed with a solution of $NH_3$, and the absorbed $CO_2$ and $H_2S$ were thereafter driven off by cautious heating to somewhat over 90° C., and the residual $NH_3$ solution was used anew for the washing of the gases. It was found not feasible to employ this method in practice, because the carbon dioxid (which was always present in large quantity and which drives the sulfureted hydrogen out of the solution,) made it necessary to maintain more ammonia in the circulation than was necessary for combination and consequently very large quantities of liquid had to be heated and cooled. It has also been proposed to wash the gas with liquid containing, in suspension, hydrated iron oxid or bog iron ore. This method, however, failed because hydrated iron oxid reacts much too slowly in the absence of a sufficient quantity of alkali.

The present invention contemplates freeing the gas from sulfureted hydrogen by utilizing the great affinity of the alkalis for sulfureted hydrogen, to remove the latter from the gas, and, furthermore, contemplates the regenerating of the alkaline sulfids so produced, by treating them with hydrated iron oxid. By means of this combination it is made possible to expedite the naturally slow reaction between sulfureted hydrogen and hydrated iron oxid, even in the wet process, to such an extent that the gas purification can be carried out in an extremely small space.

In the practice of the invention, the gas is treated in a suitable washer with an alkaline solution, and then the alkaline sulfids so produced are deprived of their sulfur by a wash liquid, containing, in suspension, hydrated iron oxid, so that the alkaline solution can be utilized anew for the purification of the gases from sulfureted hydrogen. A particular embodiment of this method, which is especially feasible on account of the large quantity of carbon dioxid often present in the gases of coal distillation, consists in simultaneously supplying to the washer with the alkaline solution the hydrated iron oxid, so that the regenerating of the alkaline solution proceeds at once and so that the solution becomes constantly anew in condition to wash out sulfureted hydrogen. The saturated iron-sulfur compounds are removed from the alkaline solution by filtration, decanting, or the like, and the filtrate with a fresh quantity of the hydrated iron oxid is employed anew for the washing.

The invention extends further to the employment of the ammonia contained in the gas itself instead of a separate alkali, by having the removal of the sulfureted hydrogen follow immediately upon the removal of the tar, i. e., the sulfureted hydrogen purification is undertaken while the gas still contains its ammonia. The employment of a special alkali in such case is superfluous, because, as noted, the ammonia contained in the gas serves as such. Of course, in this method of sulfureted hydrogen purification, as soon as the washing liquid is saturated with $NH_3$, a further washing out of the ammonia by the washing liquid does not take place. This mode of operation has the special advantage that all of the difficulties incident to sulfureted hydrogen in the recovery of ammonia disappear, and the ammonia, as such or as sulfite or sulfate of ammonia can be recovered from the gas direct and in the purest condition. Heretofore, in the recovery of concentrated ammonia water or sal-ammoniac spirit, the sulfureted hydrogen contaminated these by-products; whereas, in the recovery of ammonium sulfate by the aid of foreign sulfuric acid, the sulfureted hydrogen is able to reduce the sulfuric acid to sulfurous acid In the above described method of sulfureted hydrogen purification, the cyanogen contained in the gases, unless special measures are taken to prevent it, will take up a large part of the hydrated iron oxid by the formation of insoluble iron-cyanogen compounds, whereby the complete regeneration and re-utilization of the purifying mass is made more difficult. The invention therefore contemplates avoiding the production of insoluble iron-cyanid compounds by adding to the alkaline solution some sulfur or some of the mass containing sulfur, or by mixing with the gas a quantity of air or oxygen. By this means, all of the cyanogen is simultaneously and completely absorbed, because alkaline polysulfids can form and all of the cyanogen is converted into the corresponding alkali-sulfo-cyanogen compounds. Inasmuch as these compounds are readily soluble, they can be readily separated from the iron-sulfur compounds and can be subjected to a special treatment. The treatment of these sulfo-cyanogen compounds is especially feasible from a commercial standpoint if they can be converted into a substance which is already present in the coal distillation gases and if they can be recovered as a valuable by-product. The recovery of by-products would in such case be simpler and would be particularly manifested in an increase in the output of the one valuable by-product.

A further object of the invention consists, therefore, in increasing the output of ammonia by converting the sulfo-cyanogen compounds thus obtained into ammonia, and carrying along and treating further the said ammonia together with the ammonia otherwise present in the gases. By so doing, not only is the sulfo-cyanogen product (which is in itself unwelcome) removed, and in its stead the valuable ammonia contained in the gas recovered, but the additional important advantage is attained, of enriching the gas further with ammonia.

As hereinbefore explained, the ammonia serves as an intermediary for the re-action between the sulfureted hydrogen and the hydrated iron oxid; i. e., the more ammonia is present in the gas, the more readily and reliably will the absorption of the sulfureted hydrogen go on. The conversion of the sulfo-cyanogen compounds into ammonia, may, therefore, with particular commercial advantage, be brought within the scope of dry distillation or gasification, in view of the hereinafter recited discoveries made by me, by charging the sulfo-cyanogen compounds, together with the coal, into the distilling furnaces or gasifying furnaces. These discoveries or observations involve the attainment of the fact that when sulfo-cyanid compounds are treated at a high temperature with substances which at such temperature give off hydrogen or water, the sulfo-cyanid is converted into ammonia. In the dry distillation of coal or similar substances, all of the prerequisites for such a conversion are present, and the practical carrying out of the process has also established the correctness of these observations. Accordingly, the conversion of the cyanid into ammonia is practised within the range of distilling processes or gasifying processes without requiring any special apparatus or operating mechanism, and, at the same time, the cyanogen of the gases, after having been converted into ammonia, is employed for facilitating the purifying process.

A further development and extension of the method consists in oxidizing to $SO_2$ or $SO_3$ the sulfur contained in the purification mass (separated from the alkaline solution by filtration or the like,) either per se or together with the mass, and employing the $SO_2$ or $SO_3$ for binding the $NH_3$ contained in the gas, and then restoring to the working process the mass thus freed from sulfur and therefore again receptive, and using it for regenerating the absorption liquid. In order to use the sulfur trioxid or sulfur dioxid so produced for binding the ammonia contained in the gas, with the recovery of sulfite or sulfate of ammonia, the process of Patent No. 973,164 is preferably employed, in accordance with which the gases containing $NH_3$ and the air containing $SO_2$ (or $SO_3$) are alternately brought into contact with a washing liquid without their carriers (gas and nitrogen residues) coming into contact with one another.

In practice, this process was heretofore so manipulated that the washing liquid coming from the ammonia scrubber was collected in a low-lying receptacle. The lye collecting in this receptacle consisted of ammonia water ($NH_4OH$) when the plant was put into operation and when water was employed as the washing liquid. This ammonia water was delivered by a pump to an elevated receptacle and thence supplied for the sprinkling of the $SO_2$ washer. The lye coming from the $SO_2$ washer, which then consisted, by reason of the absorption of $SO_2$, of acid ammonium sulfid $$NH_4OH + SO_2 = \genfrac{}{}{0pt}{}{NH_4}{H}\!\!\rangle SO_3$$

was likewise conveyed to a separate low-lying receptacle and again delivered by means of a pump into the separate receptacle employed for the sprinkling of the ammonia scrubber. The lye collected in this elevated receptacle, consisting of acid ammonium sulfite then again took up $NH_3$ during the sprinkling of the ammonia scrubber and normal ammonium sulfite was formed:

$$\genfrac{}{}{0pt}{}{NH_4}{H}\!\!\rangle SO_3 + NH_3 = \genfrac{}{}{0pt}{}{NH_4}{NH_4}\!\!\rangle SO_3.$$

If this cycle is carried further, it is found that alternate formation of acid and normal sulfite takes place.

$$\genfrac{}{}{0pt}{}{NH_4}{NH_4}\!\!\rangle SO_3 + SO_2 + H_2O = 2\genfrac{}{}{0pt}{}{NH_4}{H}\!\!\rangle SO_3$$

$$\genfrac{}{}{0pt}{}{NH_4}{H}\!\!\rangle SO_3 + NH_3 = \genfrac{}{}{0pt}{}{NH_4}{NH_4}\!\!\rangle SO_3.$$

For maintaining the operation of this so-called alternate washing, a number of separate elevated receptacles and low-lying receptacles for the purpose of separating the washing liquids were necessary, together with the requisite pumps for transferring the lye back and forth.

The invention includes a simplification of the foregoing method by utilizing as the wash liquid a mixture of acid and normal ammonium sulfite which mixture is supplied from a common elevated receptacle to the $NH_3$ scrubber as well as to the $SO_2$ scrubber and is collected from this apparatus in a common low-lying receptacle. This wash liquid is always in condition to take up $SO_2$ as well as $NH_3$ and during the passage through the $SO_2$ scrubber the normal sulfite $$\genfrac{}{}{0pt}{}{NH_4}{NH_4}\!\!\rangle SO_3$$

will be converted into acid sulfite $$\genfrac{}{}{0pt}{}{NH_4}{NH_4}\!\!\rangle SO_3 + SO_2 + H_2O = 2\genfrac{}{}{0pt}{}{NH_4}{H}\!\!\rangle SO_3$$

whereas the acid ammonium sulfite contained in the wash liquid passes this $SO_2$ washer unchanged. In the $NH_3$ scrubber, on the contrary, the normal ammonium sulfite remains unchanged whereas the acid ammonium sulfite $$\genfrac{}{}{0pt}{}{NH_4}{H}\!\!\rangle SO_3$$

will be converted into normal ammonium sulfite—

$$\genfrac{}{}{0pt}{}{NH_4}{H}\!\!\rangle SO_3 + NH_3 = \genfrac{}{}{0pt}{}{NH_4}{NH_4}\!\!\rangle SO_3.$$

The lye again collecting in the common low-lying receptacle and coming from the $NH_3$ scrubber and the $SO_2$ scrubber consists therefore of a mixture of acid and normal ammonium sulfite, and is therefore again adapted to absorb $SO_2$ as well as $NH_3$ and to serve for sprinkling the beforementioned apparatus. Instead of several elevated receptacles and low-lying receptacles and the corresponding number of pumps for conveying the wash liquid, only one elevated receptacle and one low-lying receptacle and one pump is used in this method. The method is therefore materially simplified in its apparatus and its manipulation. In this process, therefore, the wash liquid continuously becomes richer in normal ammonium sulfite until the limit of saturation is reached and the normal ammonium sulfite is precipitated as a solid salt. Care must now be taken that while realizing the most complete absorption possible of the ammonia, the salt can be removed in a suitable manner.

A further object of the invention consists in the separation of the ammonia from the gases of the dry distillation or gasification in two stages, i. e., first, in a saturator where the formation of the salt takes place by absorption of the greater part of the ammonia, and then in a scrubber where the remainder of the ammonia is washed out. Both of these apparatus, saturator and ammonia scrubber, are supplied from the same elevated receptacle with the wash water consisting of acid and normal ammonium sulfite. The gas which first passes through the saturator with its entire quantity of ammonia, gives up the greater part of its ammonia therein, so that necessarily the salt precipitation must take place in this apparatus. To the ammonia scrubber there then passes only a smaller part of the ammonia contained in the gases, so that in the ammonia scrubber only a moderate enrichment of the wash liquid with normal ammonium sulfite takes place and a precipitation of salt can never occur in this washer. Therefore the washing out of the ammonia is complete under all conditions because only a part of the capacity of the wash liquid introduced into the ammonia scrubber is put under requisition. Furthermore, by the absolute restriction of the salt precipitation to the saturator, all obstruction of the ammonia washer by the formation of salt is avoided.

A mode of operation which has shown itself feasible in practice will now be described, with reference to the accompanying diagrammatic drawing.

The gas produced in the furnace 1 passes through the hydraulic main 2 and conduit 3 into the cooler 4, and is cooled therein. The ammonia water separating out in the cooler is treated in the distilling column 5 and distilled back again into the gas, so that upon its exit from the cooler all of the $NH_3$ is again contained in the gas. The gas exhauster 6 sucks the gas and forces it through the tar separator 7 where the last traces of tar are removed. Thence the gas enters the sulfureted hydrogen purifier 8 which is here assumed to be a rotating purifier of the cyanogen washer type. The wash liquid with the suspended hydrated iron oxid mass is pumped counterwise to the gas from chamber to chamber, so that in the last chamber, i. e., in the chamber in which the gas containing $H_2S$ enters, the mass is nearly saturated with $H_2S$ and the wash liquid is at its richest in sulfo-cyanid compounds. By the pipe 9 and pump 10, the mass in suspension of this last chamber is forced to the filter press 11 where a separation of the mass from the liquid takes place. A part of the liquid is pumped by the pipe 15 to the coal bunker 16, moistens the coal somewhat and enters with it into the retort bench 1, where a conversion of the sulfo-cyanogen compounds into ammonia takes place, which ammonia goes over into the gas. The conversion of the sulfo-cyanogen compounds into ammonia can also, of course, take place in separate receptacles and devices in accordance with what has been hereinbefore stated. The remaining part of the liquid pressed out and the water employed for washing of the filter cake flows through the conduit 14 into the vessel 12 provided with a stirring apparatus. The filter cake passes through the hopper 17 into the regenerator 13 where the revivification of the mass by air takes place up to the formation of sulfur dioxid or sulfur trioxid; and this revivification up to the formation of sulfur dioxid or sulfur trioxid takes place in two stages, the mass being dried in the upper drum of the regenerator by an air current, and, if necessary, by heating said drum, and is subjected to a complete oxidation up to hydrated iron oxid and sulfur; so that, in the second drum, which is supplied with a separate air current, and which is likewise adapted to be heated, only an oxidation of the sulfur already re-constituted in the first drum takes place, up to sulfur dioxid and sulfur trioxid. In this second drum, in accordance with what has been said hereinbefore, the heating can be carried so far beyond the roasting process proper that any iron sulfate compounds present which would prejudice the capacity of the mass for further absorption are removed. The mass revivified leaves the regenerator by the chute 18, falls into the receptacle 12 and together with the pressed out wash liquid is pumped back again to the rotating purifier 8 where it again enters the cycle. The $SO_2$ produced in the regenerator 13 is washed out in the air scrubber 19 and the $NH_3$ contained in the gas is washed out in the saturator 20 and ammonia washer 21. The salt produced is separated from the mother lye in the centrifugal separator 22.

Having thus described my invention, what I claim is:—

1. The method of purifying gases of dry distillation or gasification with the simultaneous recovery of the by-products, which consists in removing the sulfureted hydrogen from the gases by an alkaline solution, and regenerating the alkaline solution by hydrated iron oxid; substantially as described.

2. The method of purifying gases of dry distillation or gasification with the simultaneous recovery of the by-products, which consists in removing the sulfureted hydrogen from the gases by an alkaline solution, and regenerating the alkaline solution by hydrated iron oxid, the absorption and regeneration taking place simultaneously; substantially as described.

3. The method of purifying gases of dry distillation or gasification with the simultaneous recovery of the by-products, which consists in removing the sulfureted hydrogen from the gases by an alkaline solution, and regenerating the alkaline solution by hydrated iron oxid, the ammonia contained in the gas being employed as the alkali; substantially as described.

4. The method of purifying gases of dry distillation or gasification with the simultaneous recovery of the by-products, which consists in removing the sulfureted hydrogen from the gases by an alkaline solution, and regenerating the alkaline solution by hydrated iron oxid, the ammonia contained in the gas being employed as the alkali, and subsequently freeing the gases from ammonia; substantially as described.

5. The method of purifying gases of dry distillation or gasification, which consists in removing the sulfureted hydrogen by an alkaline solution, converting the sulfur into $SO_2$ or $SO_3$ and employing it for binding the ammonia contained in the gas, and regenerating the alkaline solution by hydrated iron oxid; substantially as described.

6. The method of purifying gases of dry distillation or gasification, which consists in removing the sulfureted hydrogen by an alkaline solution and regenerating the alkaline solution by hydrated iron oxid, a portion of the alkaline solution being converted into alkaline polysulfid solution, so that the formation of insoluble iron-cyanogen compounds is avoided and the cyanogen of the gases is converted into sulfo-cyanogen and can be treated separate from the iron-sulfur compounds; substantially as described.

7. The method of purifying gases of dry distillation or gasification, which consists in removing the sulfureted hydrogen by an alkaline solution and regenerating the alkaline solution by hydrated iron oxid, a portion of the alkaline solution being converted into alkaline polysulfid solution, converting the alkaline polysulfids into sulfo-cyanogen compounds, and converting the sulfo-cyanogen compounds formed into ammonia; substantially as described.

8. The method of purifying gases of dry distillation or gasification, which consists in removing the sulfureted hydrogen by an alkaline solution and regenerating the alkaline solution by hydrated iron oxid, a portion of the alkaline solution being converted into alkaline polysulfid solution, converting the polysulfids into sulfo-cyanogen compounds, and converting the sulfo-cyanogen compounds formed into ammonia, and commingling the ammonia thus obtained with that already contained in the gases; substantially as described.

9. In the purification of gases of dry distillation or gasification, binding the ammonia of the gas and the $SO_2$ of the air by bringing them into contact with a washing liquid which contains both normal and acid ammonium sulfite; substantially as described.

10. In the purification of gases of dry distillation or gasification, binding the ammonia of the gas and the $SO_2$ of the air by bringing them into contact with a washing liquid which contains both normal and acid ammonium sulfite to produce salt formation, and then removing the remainder of the ammonia in a scrubber; substantially as described.

In testimony whereof I affix my signature, in presence of two witnesses.

KARL BURKHEISER.

Witnesses:
 WOLDEMAR HAUPT,
 HENRY HASPER.